Jan. 23, 1968  R. W. BENNETT  3,364,628
POSITIONING APPARATUS
Filed April 1, 1965  8 Sheets-Sheet 1

Fig. 1

INVENTOR.
Robert W. Bennett
BY Charles W. Gregg
AGENT

Fig. 2

INVENTOR.
Robert W. Bennett
BY Charles W. Gregg
AGENT

INVENTOR.
Robert W. Bennett
BY Charles W. Gregg
AGENT

Fig. 12

Jan. 23, 1968 R. W. BENNETT 3,364,628
POSITIONING APPARATUS
Filed April 1, 1965 8 Sheets-Sheet 7

INVENTOR.
Robert W. Bennett
BY Charles W. Gregg
AGENT

United States Patent Office 3,364,628
Patented Jan. 23, 1968

3,364,628
POSITIONING APPARATUS
Robert W. Bennett, Corning, N.Y., assignor to Corning Glass Works, Corning, N.Y., a corporation of New York
Filed Apr. 1, 1965, Ser. No. 444,539
2 Claims. (Cl. 51—227)

ABSTRACT OF THE DISCLOSURE

A mechanism for precisely centering and rotationally aligning hollow vessels having a generally rectangular configuration and depending skirt portions or sidewalls. Such vessels may comprise the viewing panel parts and funnel parts for rectangular television picture tube envelopes, for example. The device includes a plurality of pairs of biased support rollers for engaging the skirt or sidewalls with pairs of the rollers being connected for equal opposite movement.

---

The present invention relates to positioning apparatus. More particularly the present invention relates to a mechanism for precisely centering and rotationally aligning hollow vessels having a rectangular configuration and having depending skirt portions or sidewalls such as, for example, the viewing panel parts and funnel parts of so-called rectangular television picture tube envelopes. Still more specifically the invention relates to apparatus for positioning a skirted rectangular hollow vessel so that the geometric center of the opening defined by the brim thereof and leading to the cavity therein rotationally and radially corresponds with a preselected alignment therefor.

The viewing panel or funnel of a rectangular television picture tube envelope is commonly referred to as having a major axis and a minor axis, the major axis comprising an imaginary line extending between the centers of the shorter depending sidewalls defining the cavity within the respective part and the minor axis comprising an imaginary line extending between the centers of the longer depending sidewalls defining such cavity. Thus, as is obvious, the point of crossing of said lines defines the geometric center of the cavity of the respective viewing panel or funnel part.

In the mass production of color television picture tube envelopes, it is desirable, for obvious economic reasons, to manufacture quantities of complemental viewing panel parts and funnel parts for such tube envelopes and to randomly select pairs of such parts for sealing to each other in a mating relationship in the fabrication of complete tube envelopes. Said viewing panels each contain an aperture mask which must be radially and rotationally precisely positioned with respect to the neck of the selected funnel sealed to the respective panel and, to this end, a plurality of corresponding reference protuberances are often provided adjacent the brims or sealing surfaces of the panel and funnel parts during the forming thereof. Corresponding protuberances on each randomly selected pair of mating parts are referenced to each other prior to and during the sealing of such parts to one another and, therefore, the tip or end of each corresponding protuberance on each such part is precisely ground down to provide a summit thereon which is in a preselected alignment with corresponding ones of the aforesaid axes of the respective parts. Such precise grinding of said summit on each protuberance is necessary to assure that any randomly selected panel can be precisely aligned with any randomly selected funnel to provide for the aforementioned precise positioning of the aperture mask contained in the panel.

One manner of performing the grinding of said protuberances, to provide the desired summits thereon, is to precisely and identically position each said part with respect to a set of grinding wheels, each wheel of such set being disposed so that it corresponds with the location of a different one of the protuberances on each such part and the complete set of wheels being arranged to correspond with the arrangement of all the protuberances on each part. It is, accordingly, one object of the present invention to provide a positioning device or mechanism which may be employed for precisely positioning each of a plurality of skirted hollow vessels, such as the above-mentioned viewing panels and funnels used in the fabrication of rectangular television picture tube envelopes, so that selected ones of said axes of each such part fall in an identical predetermined alignment with a set of grinding wheels used to grind summits on the protuberances provided on such part.

It is another object of the present invention to provide apparatus for precisely positioning each of a plurality of identical rectangular hollow vessels having depending sidewalls so that the geometric center of the opening leading into the cavity defined by the brim of such sidewalls of each respective vessel is rotationally and radially aligned in a preselected alignment and identically to such center of each of the other of said plurality of hollow vessels so aligned.

It is a third object of the present invention to provide a mechanism for radially and rotationally centering each of a plurality of identical rectangular hollow vessels.

In accomplishing the above objects of the present invention there is provided apparatus including three mechanically independent pairs of pivotally mounted bell cranks, the ends of first arms of which are disposed in an alignment defining an H configuration, and the ends of the second arms of each pair of cranks being interconnected so that movement of one of the first arms of each respective pair causes equal and opposite movement of the other first arm of such pair. Said bell cranks are normally biased to a first position and the ends of said first arms of such cranks are provided with rollers or wheels so that, when such rollers come into contact with the sidewalls of a skirted rectangular hollow vessel and are forced vertically along such sidewalls, the bell cranks resistively move against their biasing means and radially and rotationally preselectively position said vessel.

Other objects and characteristic features of the invention will become apparent as the description proceeds.

Although the present invention is discussed as having special utility in conjunction with rectangular color television picture tube parts and is described in conjunction with the positioning of such parts, it will be understood that such description is by way of example only and that the invention may be employed in the positioning of any suitable types of rectangular hollow vessels.

The invention will best be understood with reference to the accompanying drawings in which.

Similar reference characters refer to similar parts in each of the figures of the drawings.

Referring to FIGS. 1 through 10 of the drawings in detail, there is shown a support 10 comprising a casting including a table or platform 11 having a flat top portion, the plan of which has the general configuration of a Celtic cross, and a ribbed lower section for strengthening thereof. Support 10 also includes a column 12 extending upright from platform 11 at substantially the center thereof and provided on its upper end with a portion 13 comprising a plurality of sidewardly extending flanges each having a hole such as 14 extending therethrough normal to platform 11. The holes such as 14 are mounting holes by which the support 10 and the associated apparatus may be dependingly suspended, in the position generally illustrated in FIG. 1, by bolts projected through said holes and fastened to any suitable overlying supporting means, such means forming a no part of the present invention and, therefore, not shown in the drawings. Alternatively, the apparatus can be mounted in positions other than that shown in FIG. 1 such as, for example, by inverting the apparatus and bolting the flange portion 13 to the top surface of a supporting bed or table. This will be readily apparent to those skilled in the art.

A first pair of bell cranks 16 and 17 are pivotally mounted on the top of platform 11 by pivotal means 18 and 19, respectively, provided adjacent opposite ends of a first cross-part of cross-shaped platform 11. The specific details of the pivotal means 18 and 19 which provide for limited pivotal movement of bell cranks 16 and 17 will be discussed hereinafter in conjunction with FIG. 5 of the drawings, it being sufficient to point out at this point in the description that each such pivotal means includes jaw-shaped mountings such as 34 and 36, respectively (FIGS. 1, 2 and 5) which are secured in any convenient manner to the top of platform 11.

Figure 2:
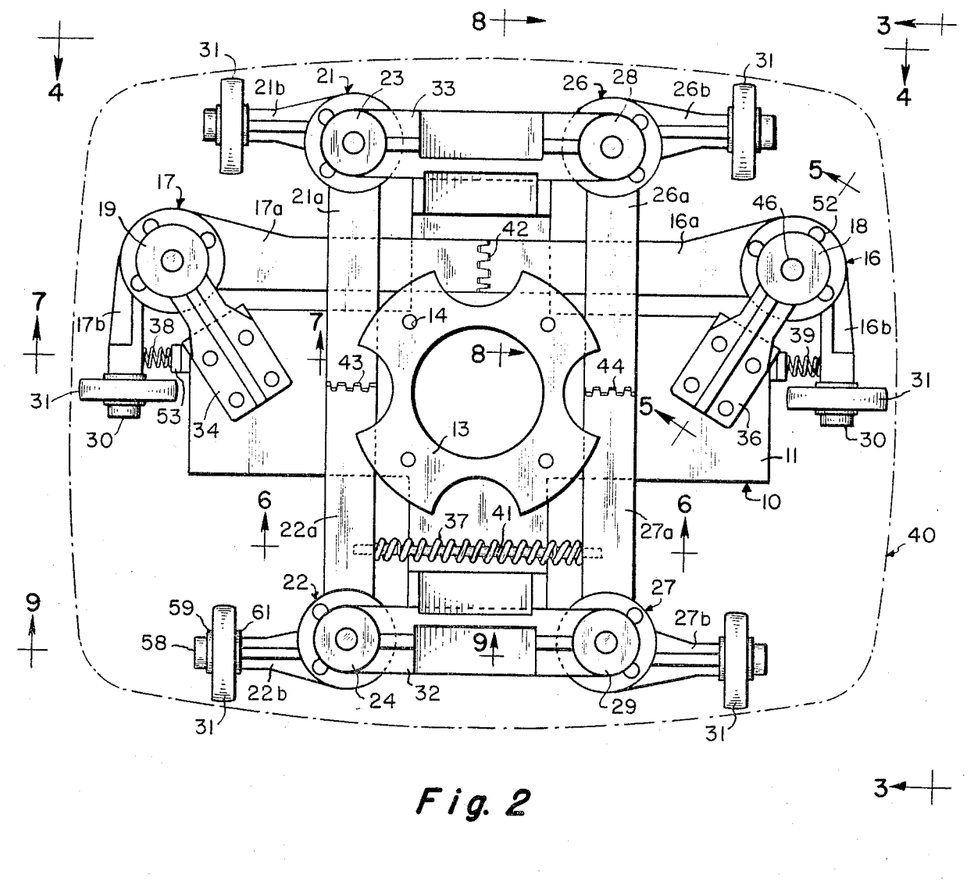
FIG. 2 is a top plan view of the apparatus of FIG. 1.
Figure 3:
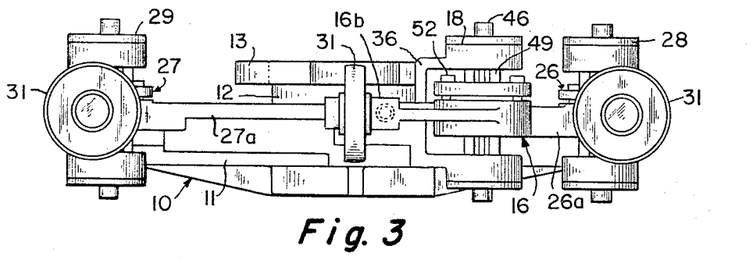
FIG. 3 is an end elevational view of the apparatus taken along line 3—3 of FIG. 2.
Figure 4:
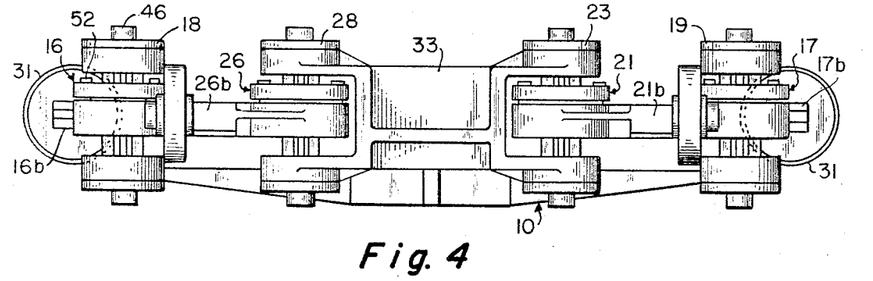
FIG. 4 is a side elevational view of the apparatus taken along line 4—4 of FIG. 2.
Figure 9:
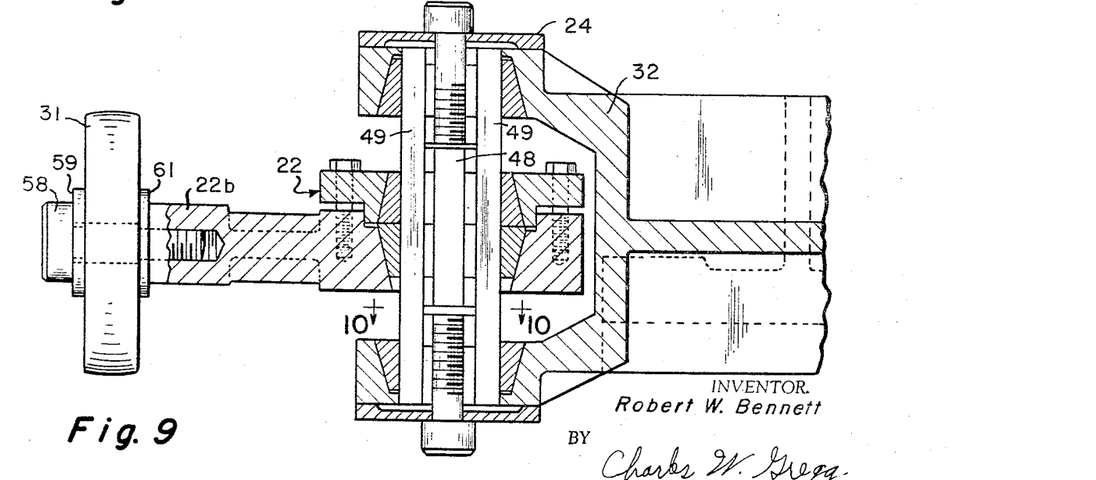
FIG. 9 is a partial section taken along line 9—9 of FIG. 2.

Bell cranks 16 and 17 each comprise a pair of first and seconds arms 16a and 16b, and 17a and 17b, respectively. Arms 16a and 17a of cranks 16 and 17 extend toward each other and are interconnected by a plurality of intermeshing gear teeth such as 42 provided on the ends of such arms (FIG. 2). Arms 16b and 17b extend substantially parallel with one another and the free ends thereof are each provided with a roller or wheel such as 31 rotatively mounted on the free end of the respective arm by a screw such as 30 (FIG. 2) or 58 (as illustrated in FIG. 9). Arms 16b and 17b are of an equal length so that an imaginary line extended between the centerlines of the peripheries of the rollers, such as 31, provided on the end of each such arm extends parallel with the previously mentioned major axis of a vessel, that is, with an imaginary line extending between the centers of the shorter depending sidewalls defining the cavity within a rectangular television picture tube viewing panel or funnel part, for example, disposed over said rollers. Such a vessel is illustrated as being so disposed by the dot-dash line 40 indicated in FIG. 2 of the drawings.

It is pointed out at this time that the interconnection of arms 16a and 17a by a plurality of gear teeth such as 42 (FIG. 2) provides for equal and opposite movement of the other of the arms 16b or 17b when one of the latter arms is moved to the left or right, as viewed in FIG. 2 of the drawings. It is also pointed out that arms 16a and 17a could, if found expedient or desirable, be interconnected by means other than gear teeth, such as for example, by a fork and pin arrangement, to provide for the equal and opposite movement of arms 16b and 17b.

First and second supports 32 and 33 are secured to the top of platform 11 adjacent first and second ends, respectively, of the second cross-part of such cross-shaped platform. Support 32 includes, at first and second ends thereof, pivotal means 24 and 29, respectively, each of which are similar to the previously mentioned pivotal means 18 or 19 and both of which will be further discussed hereinafter in this description. Similarly, support 33 includes, at first and second ends thereof, pivotal means 23 and 28, respectively, each such means also being similar to the pivotal means 18 or 19 previously mentioned. It is believed readily apparent that the arrangement of support 33 and its associated pivotal means provided at the second end of the second cross-part of platform 11 corresponds to the arrangement of support 32 and the associated pivotal means provided at the first end of such cross-part of platform 11.

A second pair of bell cranks 21 and 22 are pivotally supported on first corresponding ends of supports 33 and 32, respectively, by the pivotal means 23 and 24, respectively. Similarly, a third pair of bell cranks 26 and 27 are pivotally supported on the second corresponding ends of supports 33 and 32, respectively, by the pivotal means 28 and 29, respectively. Cranks 21 and 22 each include a pair of first and second arms 21a and 21b, and 22a and 22b, respectively. The ends of the first arms 21a and 22a of cranks 21 and 22 are interconnected by a plurality of gear teeth 43 so that any movement of one of the second arms 21b or 22b of such cranks causes an equal and opposite movement of the other of such second arms. That is to say, as viewed in FIG. 2 of the drawings, an upward or downward movement of arm 21b, for example, causes an equal downward or upward movement, respectively, of arm 22b. Similarly, an upward or downward movement of arm 22b causes an equal downward or upward movement, respectively, of arm 21b. The free end of each of the arms 21b and 22b is provided with a roller or wheel such as 31 rotatably mounted on the respective arm by a threaded screw such as 58 (FIG. 9) which is threaded into complemental threads provided in a hole in the end of the respective arm. The usual pair of washers such as 59 and 61 (FIG. 9) are provided adjacent opposite faces of each such wheel or roller. It is pointed out at this time that the rollers such as 31 provided on the ends of arms 16b and 17b of bell cranks 16 and 17 are also mounted thereon in a manner similar to that illustrated in FIG. 9 of the drawings.

Cranks 26 and 27 each include a pair of first and second arms 26a and 26b and 27a and 27b, respectively. The ends of the first arms of such cranks are interconnected by a plurality of gear teeth 44 so that movement of one of the second arms of such pair of cranks causes an equal and opposite movement of the other second arm of the pair of cranks. Such motions are similar to that discussed above for cranks 21 and 22 and no detailed discussion thereof is considered necessary. The free ends of each of the second arms 26b and 27b are each also provided with a wheel or roller such as 31 or 58 mounted on the ends of such arms in the manner best illustrated in FIG. 9 of the drawings.

Arms 21b and 22b of cranks 21 and 22 are of equal length so that an imaginary line extended between the centerlines of the peripheries of the rollers such as 31 provided on the end of such arms extends parallel with the previously mentioned minor axis of a vessel such as indicated by the reference character 40 (FIG. 2) disposed over said rollers as previously discussed. That is to say, said imaginary line extended between said rollers extends parallel with an imaginary line extending between the centers of the longer depending sidewalls defining the cavity in a vessel such as 40 comprising, for example, a rectangular television picture tube viewing panel or funnel part. Similarly, arms 26b and 27b of cranks 26 and 22 are of equal length so that an imaginary line extended between the centerlines of the peripheries of the rollers such as 31 provided on the end of each such arm also extends parallel with said minor axis of a vessel such as 40, that is, parallel with said imaginary line extending between the centers of said longer depending sidewalls of such vessel. It is believed apparent, therefore, that the imaginary lines extending between the centerlines of the peripheries of the wheels or rollers provided on arms 21b and 22b, and 26b and 27b, respectively, extend parallel with each other and normal to the major axis of a vessel such as 40, that is, normal to the imaginary line extending between the centerlines of the peripheries of the rollers such as 31 provided on the ends of arms 16b and 17b.

Figure 5:
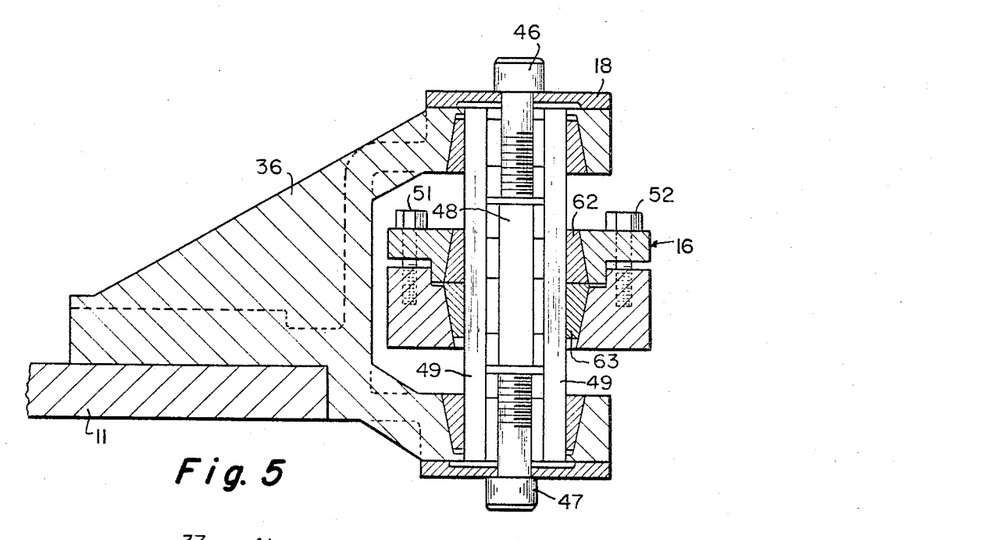
FIG. 5 is a sectional elevation taken along line 5—5 of FIG. 2.
Figures 10, 11:
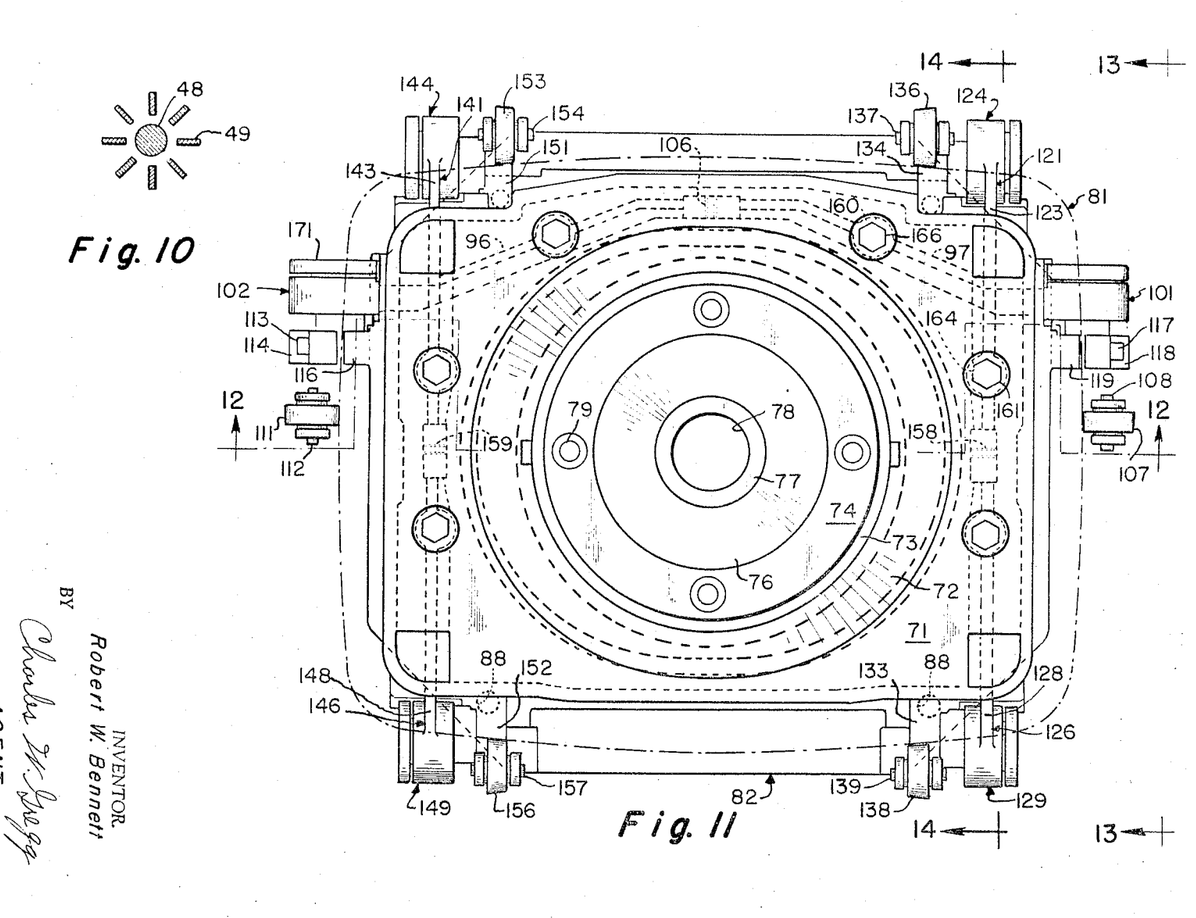
FIG. 10 is a sectional view taken along line 10—10 of FIG. 9.
FIG. 11 is a plan view of an alternative form of apparatus embodying the invention.

Referring to FIGS. 5 and 9 of the drawings, each of the previously mentioned pivotal means pivotally supporting each respective bell crank, such as 16 and 22, for example, comprises a plurality of longitudinal resilient leaf springs such as 49 symmetrically radially arranged about an axis of rotation defined by the longitudinal axis of threaded bolts such as 46 and 47 screwed into complemental threads provided within a sleeve such as 48. Such radial arrangement of the leaf springs is illustrated in FIG. 10 of the drawings. The fulcrums or pivot points of the bell cranks such as 16 and 22 are fastened to the leaf springs, such as 49, by a clamping arrangement including first and second slotted bushings such as 62 and 63 (FIG. 5) having sloped outer peripheries as illustrated. The springs such as 49 extend through the slots provided in such bushings and the bushings are caused to clamp against the sides of the springs by the tightening of bolts such as 51 and 52 of the respective bell crank. The tightening of such bolts also securely clamps the respective bell crank such as 16 to said bushings as will be obvious to those skilled in the art by a brief study of FIGS. 5 or 9 of the drawings.

The use of a pivotal means employing a plurality of leaf springs as described above provides a frictionless pivot which is not subject to wear due to the abrasive action of foreign particles or materials since there are no bearings into and between which such particles can intrude. In addition such pivotal means integrantly comprises a pivotal arrangement which resiliently returns to or resumes its original position following the removal of a force which flexes or twists said leaf springs, that is, following a flexing of springs such as 49 by a pivotal movement of the associated bell crank such as 16. Thus each of said pivotal means, such as illustrated in FIGS. 5 and 9 described above, provides a pivot arrangement integrantly incorporating resilient biasing means for returning bell cranks such as 16, 17, 21, 22, 26 and 27 to preselected normal positions therefor following pivotal movement thereof from such positions.

Figure 6:
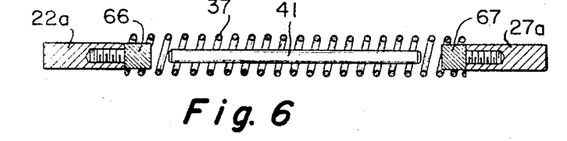
FIG. 6 is a sectional view taken along line 6—6 of FIG. 2.

Referring to FIGS. 2 and 6 of the drawings, there is shown a coil spring 37 surrounding a guide bar 41 and extending between the inner facing edges of arms 22a and 27a of bell cranks 22 and 27, respectively, the ends of such spring projecting over threaded pins 66 and 67 screwed into complemental threads provided in said arms 22a and 27a, as illustrated in FIG. 6 of the drawings. Spring 37 provides an additional resilient biasing means for returning bell cranks 21, 22, 26 and 27 and their associated rollers to their normal positions following an actuation thereof from such positions as described hereinafter in an operational example of the apparatus.

Figures 7, 8:
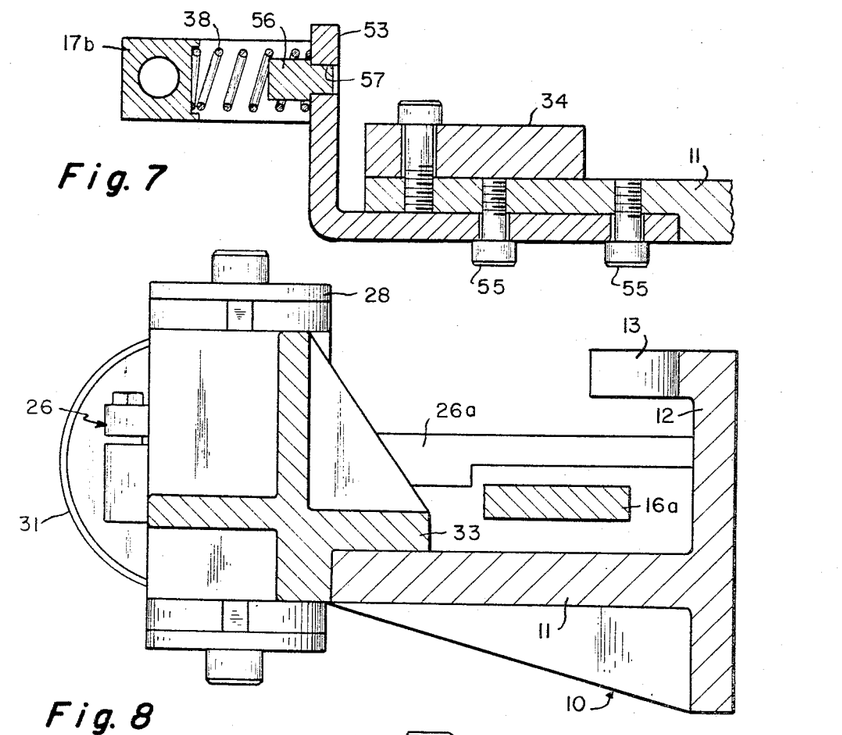
FIG. 7 is a sectional view taken along line 7—7 of FIG. 2.
FIG. 8 is a partial section taken along line 8—8 of FIG. 2.

Referring to FIGS. 2 and 7 of the drawings, there is shown a coil spring 38, one end of which projects over a shouldered pin 56 (FIG. 7) extending into a hole 57 provided in a bracket 53. Bracket 53 is affixed to platform 11 by bolts such as 55. The second end of spring 38 projects into a shallow recess provided in arm 17b of bell crank 17. Another coil spring 39 is similarly mounted between arm 16b of bell crank 16 and another bracket, such as 53, provided on platform 11 (FIG. 2). Springs 38 and 39 comprise additional resilient biasing means for returning bell cranks 16 and 17 and their associated rollers to their normal positions following an actuation thereof as hereinafter described.

It is pointed out that, when pivotal means comprising the previously discussed leaf springs such as 49 are employed for pivotally mounting the bell cranks, the additional resilient biasing means comprising coil springs 37, 38 and 39 need not necessarily be employed since the leaf springs of said pivotal means can be made so as to provide sufficient force to return the bell cranks to their normal positions. However, said coil springs are shown and described so that they can be provided in the event they are found to be expedient or desirable. It is also pointed out that, if desired, conventional pivots can be provided for rotatably mounting said bell cranks and, then, the use of the coil springs 37, 3 and 39, or other such biasing means would be necessary. This is believed readily apparent.

Before proceeding with a detailed description of the alternative form of apparatus shown in the remaining figures of the drawings in the case, a brief operational example of the apparatus thus far described will be given.

Figure 1:
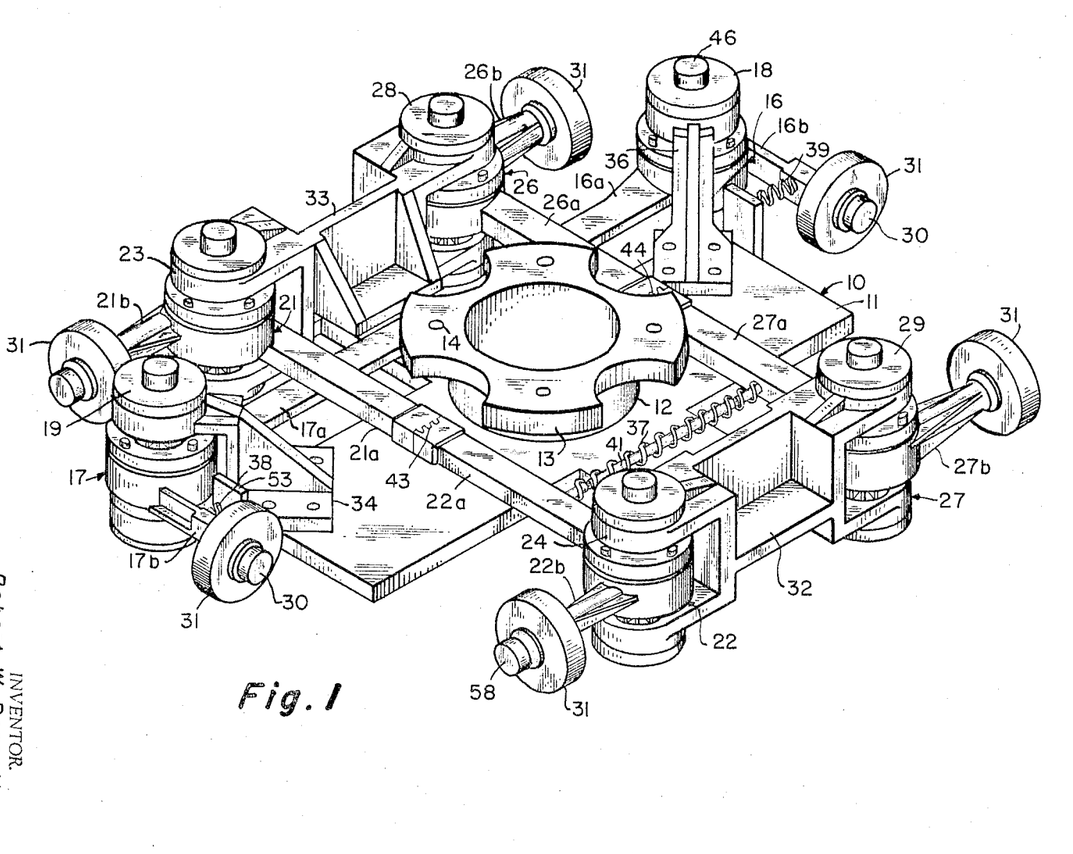
FIG. 1 is an isometric view of one form of apparatus embodying the invention.

It will be assumed that the apparatus is mounted in a depending manner as previously discussed and as generally illustrated in FIG. 1 of the drawings. A vessel having a rectangular hollow cavity, such as the viewing panel or funnel part of a rectangular television picture tube envelope, is then positioned below the apparatus with the brim of the entrance to said cavity upwardly disposed that is, if said vessel comprises a television tube viewing panel or funnel part for example, with the sealing surface of such part upwardly disposed. Such part is generally positioned so that the previously mentioned major axis thereof is substantially aligned with the rollers such as 31 provided on the ends of arms 16b and 17b of bell cranks 16 and 17, respectively, and with such rollers substantially above said sealing surface. Such alignment will also position the rollers such as 31 provided on the ends of arms 21b, 22b, 26b and 27b of bell cranks 21, 22, 26 and 27, respectively, generally above said sealing surface. Said vessel or part is then moved upwardly toward the positioning apparatus or, alternatively, such apparatus is moved downwardly toward the respective part, until points near the outer limits of the peripheries of the rollers such as 31 contact or are contacted by the inner peripheral border of said brim or sealing surface, it being understood that each pair of said rollers are spaced apart a distance corresponding to the dimensions of the parts to be positioned. Following the contacting of the inner peripheral border of the brim or sealing surface by said points on the rollers such as 31, additional force is provided to move the respective vessel or part and the positioning apparatus further towards each other, and the rollers then move over said border and up onto or up along the inner surfaces of the respectively associated depending sidewalls of the vessel or part. At such time the bell cranks and their respectively associated rollers are moved, against the force of their respective biasing means, from their normal extended positions, thereby applying force against said inner surfaces of said sidewalls to move the part or vessel into a desired position. The interconnections between the first arms of each pair of bell cranks assures the geometric centering of the cavity of the vessel or tube part in relation to the positioning apparatus, as will be recognized by those skilled in the art.

As previously mentioned rectangular television picture tube viewing panels and funnels are often provided with a plurality of complemental protuberances adjacent the outer peripheral border of their sealing surfaces, such protuberances being ground down by a set of grinding wheels to provide summits thereon for optimumly aligning pairs of such parts to each other. By employing the positioning apparatus of the present invention in conjunction with such a set of grinding wheels, said summits can be provided on the protuberances on a plurality of tube parts with assurance that randomly selected pairs of such parts can be repetitively, optimumly and precisely reference to each other by alignment of the summits on each respectively randomly selected pair of parts. Although the positioning apparatus of the present invention has special utility for the purpose just discussed, it will be understood that such use of the apparatus is only by way of an example of the utility thereof, and that such apparatus can be utilized in conjunction with any arrangement of devices or mechanisms in which suitable hollow vessels are to be precisely geometrically positioned, or centered and aligned.

Referring now to FIGS. 11 through 19 of the drawings, the alternative form of apparatus embodying the invention will be described. However, it is believed expedient to first point out that such alternative form of apparatus broadly embodies the essential features of the apparatus shown in FIGS. 1 through 10 and operates in a similar manner with the exception that, during a positioning operation, the alternative form of mechanism contacts the outer surfaces of the depending sidewalls of a hollow vessel adjacent the outer peripheral border of the brim thereof, rather than the inner surfaces of said sidewalls as in the previously described embodiment of the invention.

Figure 12:
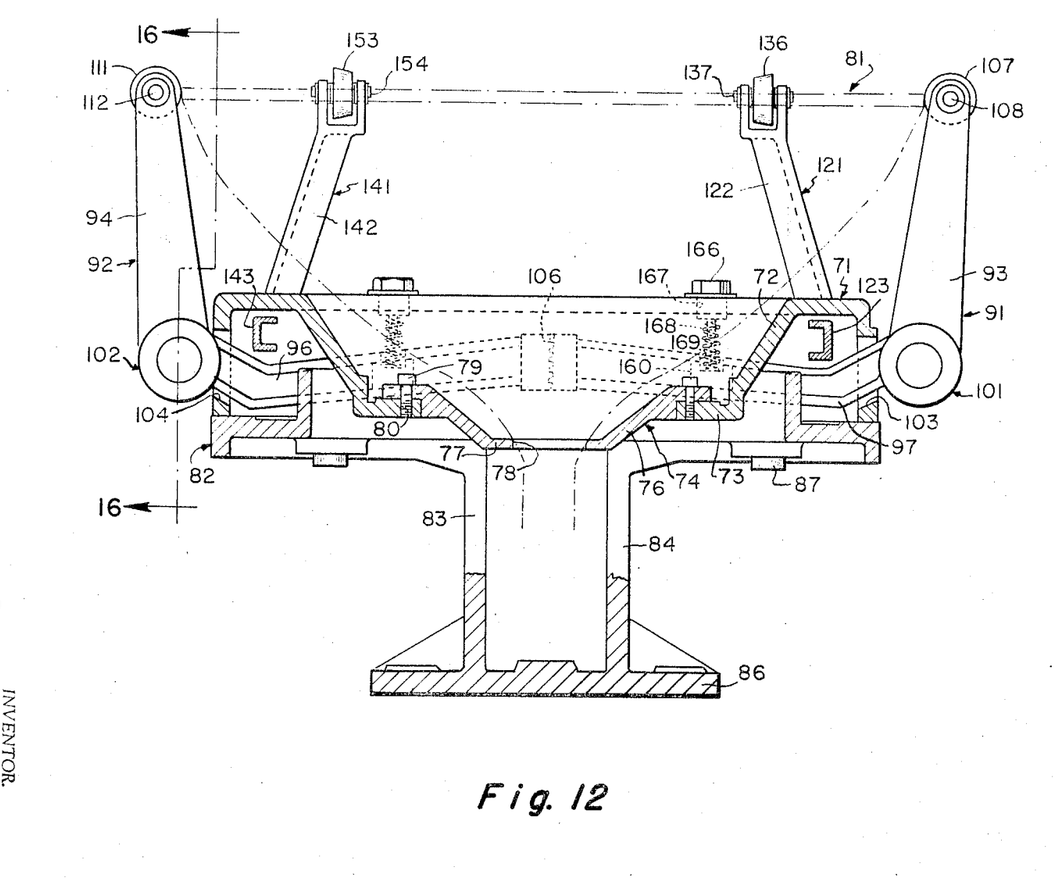
FIG. 12 is a partial section taken generally along line 12—12 of FIG. 11.

Referring to FIGS. 11 through 19 in detail, there is provided a somewhat basin-shaped rectangular support 71 comprising a casting provided with an open bottom hollow or cavity portion formed by a sloping inner sidewall 72 having a slightly elliptical configuration (FIGS. 11 and 12). A smaller circular bowl-shaped or basin-shaped casting 74 is provided and has a hollow portion defined by a sloping sidewall 76 which extends downwardly through the open bottom of casting 71. Casting 74 is secured in such position by a plurality of bolts such as 79 extending through the brim of such casting and screwed into cooperating threads provided in holes such as 80 in a flat bottom portion 73 defining the perimeter of the bottom opening of support 71. Casting 74 has a narrow flat bottom portion 77 defining the perimeter of an opening or orifice 78 extending downwardly through such casting. Such arrangement of the castings 71 and 74 is not essential to the presently described embodiment of the invention but is provided for the convenient individual support of funnels for rectangular television picture tubes, the somewhat elliptical shape of the hollow part of casting or support 71 conforming to the yoke portion of such funnels and the neck portion of a funnel supported by support 71 extending downwardly through the opening 78 provided in casting 74. There is illustrated by dot-dash lines in FIG. 12 the outline of a television tube funnel 81 disposed and supported in such position.

Support or casting 71 has depending outer sidewalls which rest upon the top surface of a platform 82 comprising a casting having a pair of spaced-apart supporting uprights or legs 83 and 84, and a base portion 86 by which such casting may be mounted on the top surface of a table or other supporting means. When supported by the apparatus thus far described, the neck portion of a television picture tube funnel such as 81 extends downwardly between the spaced-apart uprights or legs 83 and 84 (FIG. 12). Support or casting 71 is secured to platform 82 by bolts such as 87 extending upwardly through holes provided in such platform and screwed into cooperating threads in holes such as 88 (FIG. 11) provided in lug portions such as 133 and 152 on the outer surface of the depending sidewalls of casting 71. The details of such arrangement are not shown in the drawings for purposes of simplification thereof but the manner of securing casting 71 to platform 82 will be readily apparent to those skilled in the art. It will also be apparent to those skilled in the art that the apparatus need not be mounted in an upstanding position as illustrated in FIG. 12, but, if found desirable or expedient, the apparatus may be inverted from the position shown in the drawings and mounted in a depending fashion by securing base 86 to any suitably overlying or overhead support.

Figure 13:
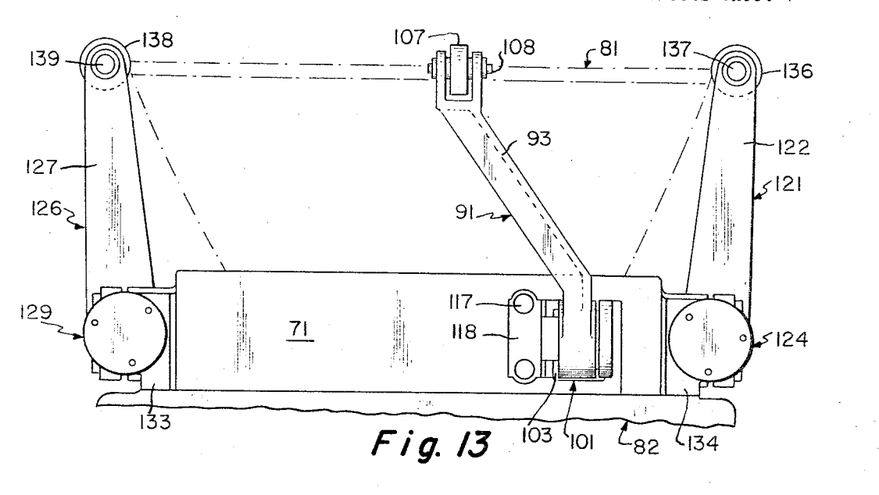
FIG. 13 is an end elevational view taken along line 13—13 of FIG. 11.
Figures 16, 17, 18, 19:
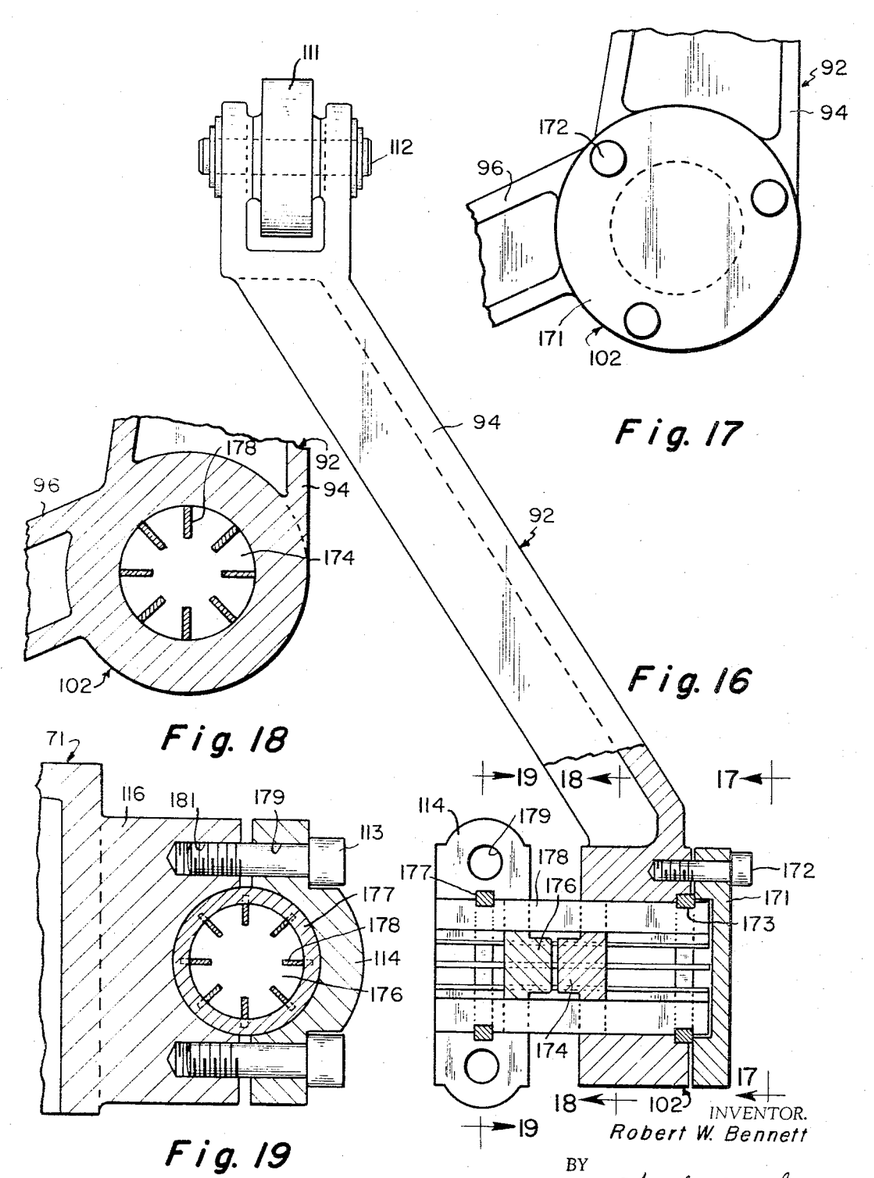
FIG. 16 is a partial section taken generally along line 16—16 of FIG. 12.
FIG. 17 is an elevational view taken generally along line 17—17 of FIG. 16.
FIG. 18 is a sectional view taken generally along line 18—18 of FIG. 16.
FIG. 19 is a sectional view taken generally along line 19—19 of FIG. 16.

A first pair of similar bell cranks 91 and 92 (FIG. 12) are provided and are mounted, in the manner hereinafter discussed, on opposite ends of support 71 and to the depending sidewalls at such ends of said support. Bell crank 91 has a first arm 93 which extends in an upward direction and is offset so that it extends laterally towards the centerline of the respective sidewall of support 71 upon which such bell crank is mounted (FIG. 13). Bell crank 91 has a second arm 97 which extends in a relatively horizontal direction (FIG. 12) through an opening 103 provided in said respective sidewall of support 71. Arm 97 is somewhat laterally offset so as to clear the inner sloping sidewall 72 of support or casting 71 (FIG. 11). Bell crank 92 also has a first arm 94 extending in an upward direction and offset so that it extends laterally towards the centerline of the respective sidewall of support 71 upon which such bell crank is mounted (FIGS. 11 and 16). The second arm 96 of bell crank 92 extends in a relatively horizontal direction (FIG. 12) and through an opening 104 provided in the sidewall of support 71 upon which bell crank 92 is mounted. Arm 96 is also somewhat laterally offset so as to clear said inner sloping sidewall 72.

As best illustrated in FIGS. 13 and 16 of the drawings, rollers or wheels 107 and 111 are rotatively carried on the upper ends of the first crank arms 93 and 94, respectively, by axles 108 and 112, respectively, such rollers or wheels being precisely aligned with each other. The ends of the second crank arms 97 and 96 of the respective bell cranks 91 and 92 are provided with sets of gear teeth 106 which cooperatively intermesh with each other. By such arrangement, a movement of one of the first arms 93 or 94, in the direction of alignment of the respective roller 107 or 111 carried by such one arm, causes an equal and opposite movement of the other of such first arms. This is believed readily apparent.

The means for mounting bell cranks 91 and 92 to the sidewalls of support 71 comprise leaf spring pivots 101 and 102, respectively (FIGS. 11 and 12). The structure of such pivots will best be understood by reference to FIGS. 16 through 19 of the drawings which illustrate the details of pivot 102 mounting bell crank 92 on its respectively associated sidewall of support 71. Pivot 102 comprises a plurality of leaf springs such as 178 radially symmetrically arranged about an axis extending through the center of circular spacing devices 174 and 176 having slots about the outer periphery thereof for receipt of the leaf springs such as 178. A retaining ring 173 (FIG. 16) is provided adjacent one end of the leaf springs and the inner periphery of such ring fits into notches provided in the outer edges of such leaf springs adjacent said one end thereof. The retaining ring 173 is securely clamped to the hub of bell crank 92 by a circular cap 171 fastened to said hub by bolts such as 172 screwed into cooperating threads provided in holes in such hub. Another retaining ring 177 (FIGS. 16 and 19) is provided adjacent the other end of the leaf springs, such ring fitting into notches provided in the outer edges of the leaf springs near such other end thereof. A clamping device 114 fits partially around the outer peripheries of spacing device 176 and ring 177, and parts of the remainders of such outer peripheries fit into a curved recess provided in a lug or protuberance 116 (FIGS. 11 and 19) forming part of the sidewall of support or casting 71 adjacent the opening 104 (FIG. 12) extending through such sidewall. Clamping device 114 is secured to protuberance or lug 116 by bolts such as 113 extending through holes such as 179 through said clamping device and screwed into cooperating threads in holes such as 181 provided in such protuberance. Clamping device 114 thus securely and immovably clamps said other ends of the leaf springs to the protuberance 116 and thereby to the sidewall of support 71 adjacent the opening 104 extending therethrough.

As previously mentioned bell crank 91 is mounted on its respectively associated sidewall of casting or support 71 by a leaf spring pivot 101 secured to a protuberance or lug 119 by bolts such as 117 extending through a clamping device 118 (FIG. 11) forming part of pivot 101. Pivot 101 is mounted adjacent the opening 103 (FIG. 12) extending through said sidewall, such pivot having a structure similar to that described for pivot 102. It will be readily apparent that bell cranks 91 and 92 can pivotally move to a limited degree by the flexing of the leaf springs of their respective pivots 101 and 102. The leaf springs such as 178 of the pivots, in addition to providing for pivotal movement of the respective bell cranks 91 and 92, resiliently bias such crank arms to preselected positions, as is apparent.

Figure 14:
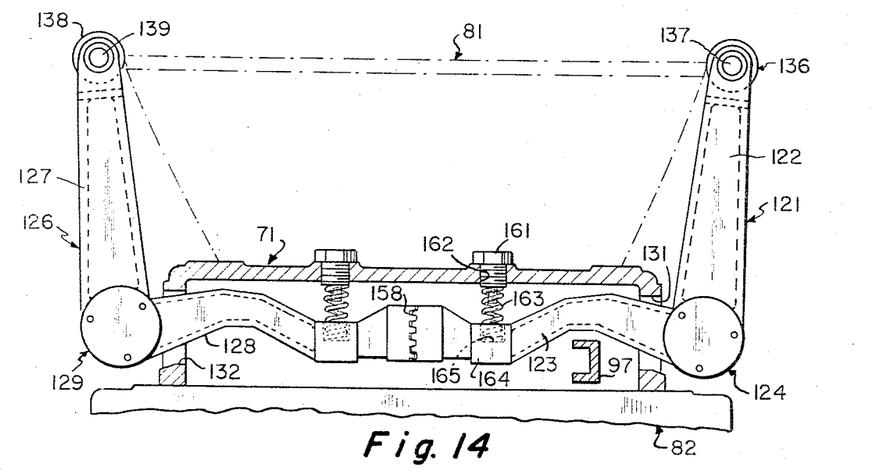
FIG. 14 is a partial section taken along line 14—14 of FIG. 11.

A second pair of bell cranks 121 and 126 each comprising a pair of first and second arms 122 and 123, and 127 and 128, respectively, are mounted on opposite depending sidewalls of support or casting 71 by leaf spring pivots 124 and 129, respectively (FIGS. 11, 13 and 14). Pivots 124 and 129 are secured to their respective sidewalls of casting 71 by being bolted to lugs or protuberances 134 and 133, respectively, provided on such sidewalls near corresponding ends thereof (FIG. 11). The structure of said pivots and their mounting arrangement are similar to that described for pivots 101 and 102 and no detail discussion thereof is believed necessary.

The first arm 122 of bell crank 121 extends in a substantially vertical direction and has rotatively mounted on the upper end thereof a roller 136 carried on an axle 137. Similarly the first arm 127 of bell crank 126 extends in a relatively vertical direction and has rotatively mounted on the upper end thereof a roller 138 carried by an axle 139. The second arms 123 and 128 of such bell cranks extend in a somewhat horizontal direction through openings 131 and 132, respectively, leading through the associated sidewalls of casting 71 adjacent the protuberances 134 and 133, respectively, upon which pivots 124 and 129 are supported. The ends of the bell crank arms 123 and 128 are interconnected by cooperatively intermeshing gear teeth 158 so that movement of one of the first arms 122 or 127 of bell cranks 121 and 126, respectively, will cause equal and opposite movement of the other of such first arms.

The rollers 136 and 138 carried on the upper ends of bell crank arms 122 and 127 are aligned with each other and normal to a centerline extending between the outer peripheries of rollers 107 and 111 carried on bell crank arms 93 and 94. By such alignment rollers 136 and 138 are aligned parallel with the previously mentioned minor axis of a hollow vessel such as 81 introduced to the positioning apparatus for alignment thereof. Said arms 122 and 127 are slightly offset in a direction towards said minor axis (FIG. 12) and rollers 136 and 138 carried by such arms are beveled (FIG. 11) to conform to the slightly curved respective sidewalls of the hollow vessel such as 81.

A third pair of bell cranks 141 and 146 are mounted by leaf spring pivots 144 and 149, respectively, to the opposite depending longer sidewalls of casting 71 and adjacent the ends thereof opposite the ends on which pivots 124 and 129, respectively, are mounted. Pivots 144 and 149 are mounted on protuberances or lugs 151 and 152, respectively, provided on said sidewall adjacent openings extending therethrough in a manner similar to openings 131 and 132.

The details of the bell cranks 141 and 146, and their mounting arrangement, is believed readily understood from the previous description of the other bell cranks and associated apparatus and, therefore, such details are not shown in the drawings for purposes of simplification thereof. It is sufficient for an understanding of the arrangement of bell cranks 141 and 146 to point out that such bell cranks each have first vertically extending arms such as 142 (FIG. 12) and second horizontally extending arms 143 and 148, respectively (FIG. 11), the ends of such second arms being interconnected by sets of cooperatively intermeshing gear teeth 159. The upper ends of the vertical first arms of bell cranks 141 and 146, respectively, rotatively carry rollers 153 and 156 on axles 154 and 157, respectively. Rollers 153 and 156 are aligned with each other and parallel with the alignment of rollers 136 and 138 of bell cranks 131 and 126, that is, normal to the alignment of rollers 107 and 111 of bell cranks 91 and 92. Such rollers are intended to contact the outer depending sidewalls of a vessel such as 81 at preselected points thereon as illustrated in FIG. 11 of the drawings, the vertical arms of bell cranks 141 and 146 being slightly laterally offset in a manner similar to the corresponding arms 122 and 127 of bell cranks 121 and 126, respectively.

As previously mentioned, the leaf spring pivots employed in the alternative form of apparatus illustrated in FIGS. 11 through 19 of the drawings provide for resiliently biasing the bell cranks to normal predetermined positions, that is to positions toward the axes of a vessel such as 81 introduced to the apparatus for positioning thereof. If found necessary or desirable, however, additional biasing means can be provided as illustrated in FIGS. 12 and 14 of the drawings. As shown in FIG. 12, the arms 97 and 96 of bell cranks 91 and 92, respectively, are each provided with an enlargement such as 160 having a recess such as 169 into which extends the lower end of a compressible coil spring such as 168, the upper end of such spring surrounding a lower part of a bolt such as 166 screwed into cooperating threads provided in a hole such as 167 provided in the top surface of support or casting 71. As illustrated in FIG. 14, each of the horizontal arms such as 123 of bell cranks 121, 126, 141 and 146 may be similarly provided with additional resilient biasing means comprising a compressible coil spring such as 169 (FIG. 14) having its lower end extending into a recess such as 165 provided in an enlarged portion such as 164 of each said arm. The upper end of each such coil spring surrounds a part of a bolt such as 161 screwed into cooperating threads in a hole such as 162 provided in the top surface of casting or support 71. It will be readily understood that any outward lateral movement of a vertical arm of a bell crank such as 91 and 92 will cause compression of the coil springs such as 168 associated with the horizontal arms of such cranks, such compression providing a force tending to return said cranks to their normal biased positions.

Figure 15:
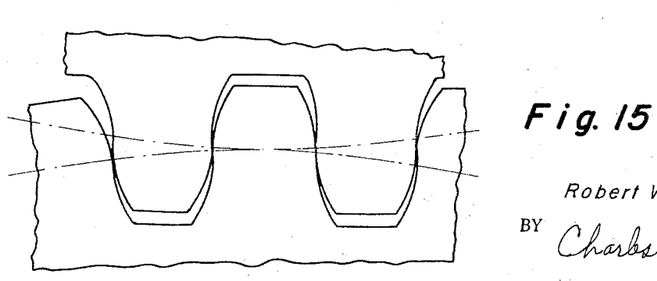
FIG. 15 is a view illustrating, on an enlarged scale, interconnections between parts of the apparatus employed in the invention.

FIG. 15 of the drawings is merely illustrative of the details of the intermeshing of the cooperative sets of gear teeth 106, 158 and 159 shown in FIGS. 11, 12 and 14 of the drawings. Such drawing figure is also illustrative of the intermeshing of the cooperative gear teeth shown in FIG. 2 of the drawings and covering the preferred form of apparatus embodying the invention.

A brief operational example of the apparatus shown in FIGS. 11 through 19 of the drawings will now be given.

The upper ends of the vertical arms of the bell cranks and their associated rollers normally occupy positions somewhat nearer to each other than those illustrated in FIGS. 11, 12, 13 and 14 of the drawings, such members being normally maintained in such positions by their leaf spring pivots and, if provided, the coil springs such as 163 and 168 bearing downwardly against the respective second arms of the bell cranks. When a hollow vessel, such as a funnel 81 of a rectangular television picture tube as illustrated in the drawings, is introduced to the positioning apparatus with its major and minor axes aligned substantially as shown in FIG. 11, the rollers first contact the depending sidewalls of the vessel or funnel, and then roll along such sidewalls towards the outer periphery of the brim thereof (FIGS. 12, 13 and 14). At such time, any outward movement of either of the vertical arms of any one of the pairs of associated bell cranks causes an equal outward movement of the other vertical arm of each such pair of cranks, and the force supplied to the contacted sidewalls of the vessel due to the biasing means of said bell cranks moves the vessel so that the geometric center of the cavity therein defined by the brim thereof is precisely disposed over the center of the orifice 78 provided in casting 74, that is, the point of crossing of the major and minor axes of a funnel part such as 81 is precisely positioned over the geometric center of orifice 78. At the same time the vessel or funnel 81 is also rotationally positioned by the rollers contacting the longer opposite depending sidewalls of vessels 81, thus placing the major and minor axes of said vessel in a predesired alignment. Such positioning of a vessel such as 81 is readily apparent from a brief study of the apparatus illustrated.

It is pointed out that vessels other than funnels for television picture tubes can be positioned by a mechanism such as that illustrated in FIGS. 11 through 19 of the drawings. For example, the apparatus can be employed for precisely positioning viewing panels for rectangular television picture tubes. This may be accomplished by inverting the apparatus and mounting it in a depending fashion from an overhead support, as previously mentioned. A viewing panel may then be disposed upon the top surface of a table or other support provided beneath the positioning apparatus and such apparatus then lowered toward the viewing panel so that the rollers thereof contact the desired points of the respectively associated sidewalls of the viewing panel. Alternatively, a viewing panel support means can be provided upon the top surface of casting 71, or within the cavity thereof, and then a viewing panel can be introduced to the positioning mechanism with such mechanism upwardly disposed as illustrated in FIG. 12. Further, with the apparatus invertedly mounted as discussed above, it can be lowered over a funnel such as 81 and the funnel positioned while it is disposed with its brim resting upon the surface of a table or support as discussed above in connection with a viewing panel. Of course the table or support upon which a viewing panel or funnel, or other vessel, is disposed may be moved upwardly toward the centering mechanism, rather than moving such mechanism downwardly toward the table and the supported vessel as mentioned above.

From the foregoing descriptions of the preferred and alternative forms of apparatus embodying the disclosed invention it will be apparent to those skilled in the art that both such forms of apparatus operate in similar manners to precisely position hollow vessels such as funnels or viewing panels for rectangular television picture tubes introduced thereto, the only difference in such operation being that one of the mechanisms contacts points on the outer surfaces of the depending sidewalls adjacent the outer periphery of the brim or sealing surface of each respective vessel introduced to such mechanism for positioning thereof, while the other mechanism contacts points on the inner surfaces of the depending sidewalls adjacent the inner periphery of the brim or sealing surface of each such vessel.

It is pointed out that the term roller or rollers as employed herein is not intended to be confined to rollers which are pivotally mounted for rotation thereof but such terms is also intended to include non-rotating devices which may, for example, be made of a self-lubricating material and will slide rather than roll along the depending sidewalls of a vessel or a funnel for a television picture tube introduced to the positioning mechanism. The use of such non-rotating rollers or vessel contacting devices in place of pivotally mounted rollers such as shown and discussed herein is well within the scope of the present invention and the spirit and scope of the appended claims.

Although there is herein shown and described only two forms of apparatus embodying the invention, it is to be understood that various changes and modifications may be made therein with the purview of the appended claims without departing from the spirit and scope thereof.

What is claimed is:

1. Apparatus for rotationally and radially positioning the geometric center of the plane of the rectangular brim of a rectangular hollow vessel in accordance with a preselected alignment, said apparatus comprising: a first pair of bell cranks pivotally mounted on a support and having first arms interconnected so that movement of one of the second arms of said pair causes equal and opposite movement of the other of the second arms of said pair, the free ends of such second arms each being provided with a roller, such rollers being spaced apart and aligned so that preselected points about the perimeters of the rollers may respectively contact a rectangular hollow vessel adjacent the brim edge thereof and adjacent the centers of first and second opposite sidewalls respectively of such vessel; a second pair of bell cranks pivotally mounted on said support and having first arms interconnected similarly to said first pair of bell cranks, the free ends of the second arms of such second pair of bell cranks each being provided with a roller, such rollers being spaced apart and aligned so that preselected points about the perimeters of the rollers may respectively contact said vessel adjacent the brim edge thereof and at points equidistantly removed in a first direction from the centers of third and fourth opposite sidewalls respectively of said vessel; a third pair of bell cranks pivotally mounted on said support and having first arms interconnected similarly to said first pair of bell cranks, the free ends of the second arms of such third pair of bell cranks each being provided with a roller, such rollers being spaced apart and aligned so that preselected points about the perimeters of the rollers may respectively contact said vessel adjacent the brim edge thereof and at points equidistantly removed in a second direction from the centers of said third and fourth opposite sidewalls respectively of said vessel; means associated with and connected to each pair of bell cranks for resiliently biasing said rollers to their said sidewall contacting positions, whereby each of a plurality of hollow vessels is identically precisely positioned by forcing each such vessel against said points on said rollers and counter to the force of said resilient biasing means while said rollers contact their repectively associated sidewalls adjacent the brim edge of the respective vessel.

2. A device for precisely positioning each of a plurality of viewing panel parts and funnel parts to be used in the fabrication of rectangular television picture tube envelopes, the major and minor axes of each such part having preselected dimensions identical to the major and minor axes respectively of each of the others of such parts; said device comprising, first, second and third pairs of bell cranks pivotally mounted on a support, each such pair having first arms so interconnected that movement of one of the second arms of the respective pair causes equal and opposite movement of the other second arms of that pair; a roller mounted on the free end of each of the second arms of said cranks, the perimeters of the pair of rollers mounted on the said first pair of cranks being aligned with each other and separated by a distance selected in accordance with said preselected dimension of one of said axes, the perimeters of each of the pairs of rollers mounted on said second and third pairs of cranks, respectively, being aligned with each other and separated by a distance selected in accordance with said preselected dimension of the other of said axes, the alignment of the pair of rollers on said second pair of cranks being parallel with the alignment of the pair of rollers on said third pair of cranks, and the alignment of the pairs of rollers on the second and third pairs of cranks being normal to the alignment of the pair of rollers on said first pair of cranks; and means connected to each said pair of cranks for resiliently biasing each respective pair of rollers to first positions wherein the perimeter of each roller contacts and presses the sidewalls of each respective tube envelope part introduced thereto, whereby each such tube envelope part is rotationally and radially positioned so that said axes of the respective part coincide with a preselected alignment therefor.

References Cited

UNITED STATES PATENTS

| | | | |
|---|---|---|---|
| 175,567 | 4/1876 | Krause | 269—218 X |
| 2,826,870 | 3/1958 | Soubier | 269—49 X |
| 2,948,988 | 8/1960 | Stutske | 65—152 |
| 2,959,894 | 11/1960 | Zonneveld | 65—154 X |
| 3,170,232 | 2/1965 | Craver | 269—52 X |
| 3,279,783 | 10/1966 | Blackenship | 269—47 |

FOREIGN PATENTS

| | | |
|---|---|---|
| 8,295 | 8/1899 | Norway. |

HAROLD D. WHITEHEAD, *Primary Examiner.*